G. Hayes,
Skylight.
No. 100,143. Patented Feb. 22, 1870.
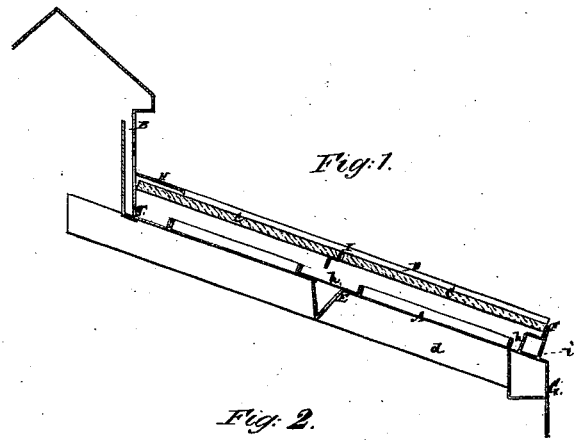
Fig. 1.
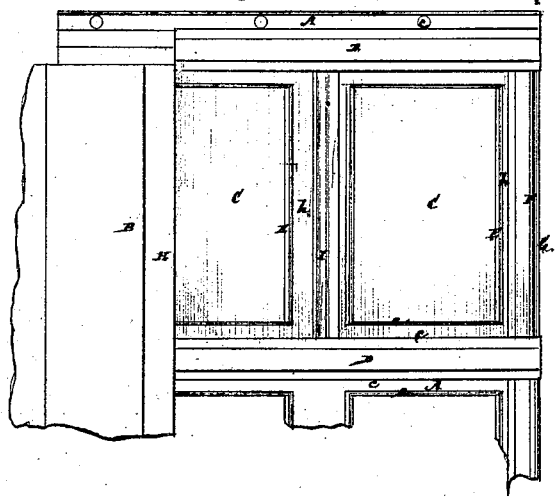
Fig. 2.
Fig. 3.
Fig. 4. Fig. 5. Fig. 6. Fig. 7.
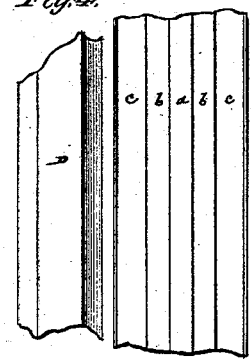
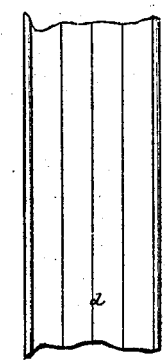
Witnesses:
Fred. Haynes
R. E. Rabeau
George Hayes

United States Patent Office.

GEORGE HAYES, OF NEW YORK, N. Y.

Letters Patent No. 100,143, dated February 22, 1870.

IMPROVEMENT IN SKY-LIGHTS.

The Schedule referred to in these Letters Patent and making part of the same.

To all whom it may concern:

Be it known, that I, GEORGE HAYES, of the city, county, and State of New York, have invented a new and useful Improvement in the Construction of Sky-Lights, Conservatory and other Glazed Roofs or Structures, of which the following is a full, clear, and exact description, reference being had to the accompanying drawing forming part of this specification, and in which—

Figure 1 represents a vertical section of the one-half or portion of a conservatory-roof constructed according to my improvement;

Figure 2, a plan of the same in part;

Figure 3, a transverse section on a larger scale of a metallic bar, with its gutters and attachments used in the construction of said roof; and Figures 4, 5, 6, and 7, plan views of the details of the same.

Similar letters of reference indicate corresponding parts.

This improvement relates to sky-lights, conservatory, and other glazed metal roofs, and consists in a novel construction of the same, whereby, while every provision is made for expansion and contraction, without straining the parts or breakage of the glass, lightness and strength is secured to the structure, and the same may be put together cheaply and expeditiously, leakage is avoided, and putty to secure the glass dispensed with; also provision made for carrying of water passing any of the joints, and, by using galvanized sheet metal, paint is rendered unnecessary.

Referring to the accompanying drawing, a prominent feature of this invention is a hollow metallic bar or rafter, A, of which there may be any number according to the size of the roof, and which, in connection with cross-beams or transoms, form the main supports of the roof, and, as applied to a conservatory roof, runs from the ventilator B to the wooden curbing.

Said hollow bars A are composed of a sheet-metal body, a, bent to form rebates, b b, for support of the panes or sheets of glass C along their one side or edge, and gutters c c for the escape of water beating or leaking into the structure.

Bracing the body a thus constructed, and made to form a part of the hollow metallic bar, is a lower V or other suitably-shaped sheet-metal molding d bent at its upper edges to overlap and clip the upper edges of the gutters c c, as at e e, and holding in between it and the body a at the base of the latter a flat metal stay-plate f, the whole being secured together by rivets through the gutters c c. As thus constructed, the said hollow bar has the appearance of a solid molded bar. The glasses C are secured in the rebates b b by means of sheet-metal caps D soldered on to the top of the bar A, no putty being used in securing the glass.

The ventilator B may be of any suitable construction, and is made to communicate by apertures g with gutters in the cross-beams that connect with the main gutters c c of the bars A, to carry off the water formed by condensation or leakage.

E E are the cross-beams or transoms, also formed hollow and of sheet metal, and provided on top with gutters h, connecting at their ends with the main gutters c c.

The glasses C are arranged so that they form or establish joints over the cross-gutters h.

They are restrained from sliding out of place by resting against a foot-strip, F, which projects upward from what is termed the frame G of the roof or sky-light, which frame lies over the usual wood curbing when the roof is fitted to its place on the building.

H is a strip of metal arranged to project from the ridge ventilator over the glass at its top, to prevent leakage past the upper edge of the top glasses.

I is a metal clip, constructed to form a lap under and over the adjacent edges of the glasses in a crosswise direction to the bars A, and extending so that they are covered at their ends by the cap-plates D. These clips cause any water which may not pass over them to the foot of the roof, but leaks through such joints, to find its way into the cross-gutters beneath the clips.

By the construction, as here shown, any water formed by condensation, or by leakage past any of the joints, is conducted by the main and cross-gutters to the foot of the roof or sky-light, and finally delivered by or through outlets i.

What is here claimed, and desired to be secured by Letters Patent, is—

1. The metallic bar or rafter A formed of a hollow sheet-metal body a, stay-plate f, and hollow molding d, fitted together and arranged to form rebates b b for the glasses, and gutters c c, substantially as specified.

2. The combination of the cap-plates D, with the hollow metal bars or rafters A, essentially as shown and described.

3. The clips I, in combination with the cross-gutters h, and main gutters c c, substantially as specified.

GEORGE HAYES.

Witnesses:
R. BRIGHTING,
A. M. STENBACK.